United States Patent
Kimmel, Jr.

(10) Patent No.: US 6,284,961 B1
(45) Date of Patent: Sep. 4, 2001

(54) SYSTEM FOR ASSOCIATING MUSICAL NOTATION WITH KEYS ON A MUSICAL INSTRUMENT

(76) Inventor: Richard C. Kimmel, Jr., 11421 131st Ave. North, Dayton, MN (US) 55327

(*) Notice: Subject to any disclaimer, the term of this patent is extended or adjusted under 35 U.S.C. 154(b) by 0 days.

(21) Appl. No.: 09/653,301

(22) Filed: Sep. 1, 2000

(51) Int. Cl.7 .................................................. G09B 15/02
(52) U.S. Cl. ............................................ 84/478; 84/479 A
(58) Field of Search ................................ 84/478, 479 R, 84/479 A

(56) References Cited

U.S. PATENT DOCUMENTS

| | | |
|---|---|---|
| D. 345,372 | 3/1994 | Ida . |
| 1,114,139 | 10/1914 | Hoffmann . |
| 1,526,547 | 2/1925 | Hughey . |
| 2,221,143 * | 11/1940 | Lang ........................... 84/478 |
| 2,284,868 * | 6/1942 | Heaney ....................... 84/478 |
| 3,616,723 | 11/1971 | Gullickson . |
| 3,958,487 | 5/1976 | Goldman . |
| 4,056,999 | 11/1977 | Bennett . |
| 4,881,443 | 11/1989 | Bertram . |
| 4,885,969 | 12/1989 | Chesters . |
| 5,107,743 | 4/1992 | Decker . |
| 5,546,843 | 8/1996 | Degaard . |

* cited by examiner

Primary Examiner—Stanley J. Witkowski

(57) ABSTRACT

A system for associating musical notation with keys on a musical instrument includes musical notations marked on a surface. The musical notations comprise a plurality of musical notes, with each of the musical notes having a color. The color of each of the musical notes corresponds to a color assigned to a particular key to be pressed on the musical instrument. Each color is represented by one of the twelve tones. Also included is a plurality of stickers for coupling to the keys of the musical instrument. Each sticker has one of twelve colors corresponding to the color of one of the tones in an octave of keys of the musical instrument. Illustratively, one of twelve colors is exclusively assigned to each one of the twelve tones in an octave of keys on the musical instrument.

11 Claims, 3 Drawing Sheets

SYSTEM FOR ASSOCIATING MUSICAL NOTATION WITH KEYS ON A MUSICAL INSTRUMENT

CROSS REFERENCE TO RELATED APPLICATION

This application is a substitute for application Ser. No. 09/044,329, filed Mar. 19, 1998.

BACKGROUND OF THE INVENTION

1. Field of the Invention

The present invention relates to music reading aids and more particularly pertains to a new system for associating musical notation with keys on a musical instrument for aiding a pupil in learning to play an instrument such as a piano.

2. Description of the Prior Art

One of the most difficult aspects of learning to play an instrument is being able to make the connection between the notes on the sheet music and the keys to be pressed by the fingers of the music student. The notes are represented on staffs comprised of parallel lines that have little visual correlation to the keys of the instrument for the beginner, and for players of all levels, as will become evident as the invention is described below.

Adding to this aforementioned difficulty is the use of different keys, which call for various combinations of sharps and flats, which alter the relationship between the notes indicated on the sheet music and the keys that are to be pressed on the instrument. The key signature, which indicates which notes are to be affected by sharps and flats, is commonly located at the far left of the treble and bass clefs on the grand staff and is thus isolated from the notes on the staffs. Adding still further difficulty to the reading of the sheet music is the presence of key changes within a piece of music. Accidentals, which are sharps, flats, naturals, double sharps, and double flats written next to notes that are not part of the key signature, also alter the key to be pressed by the student and can make the reading of sheet music more difficult.

The student reading sheet music is thus faced with the possibility of the 12 tones on an octave of keys on the instrument being represented in as many as 35 different ways on the sheet music. (This is because accidentals may be used to write each note differently—see FIG. 3.) The typical approach for teaching students is to initially isolate the student from certain keys, and music pieces in general, which include many accidentals. This limits the repertoire of the student until the student becomes more advanced, and does not eliminate the need to learn the sharps and flats associated with the various keys.

Another problem associated with the reading of sheet music is reading the notes on ledger lines which are notes which are written above the treble clef and below the bass clef. These can become difficult to read especially when there are a lot of them. The notes on ledger lines can also have accidentals next to them which can make them even more difficult to read. Many accidentals and a lot of notes on ledger lines are major reasons why musicians refer to certain pieces of music as "a mess".

The use of music reading aids is known in the prior art. However, the known devices and systems tend to ignore the hardship placed on the student by the presence of complex keys and accidentals in the sheet music.

In these respects the system for associating musical notation with keys on a musical instrument, according to the present invention, substantially departs from the conventional concepts and designs of the prior art, and in so doing provides an apparatus primarily developed for the purpose of aiding a pupil in learning to play an instrument such as a piano by a much more efficient means of reading sheet music.

SUMMARY OF THE INVENTION

In view of the foregoing disadvantages inherent in the known types of music reading aids now present in the prior art, the present invention provides a new system for associating musical notation with keys on a musical instrument wherein the same can be utilized for aiding a pupil in learning to play an instrument such as a piano.

The general purpose of the present invention, which will be described subsequently in greater detail, is to provide a new system for associating musical notation with keys on a musical instrument apparatus and method which has many Of the advantages Of the music reading aids mentioned heretofore and many novel features that result in a new system for associating musical notation with keys on a musical instrument which is not anticipated, rendered obvious, suggested, or even implied by any of the prior art music reading aids, either alone or in any combination thereof.

To attain this, the present invention generally comprises a system for associating musical notation with keys on a musical instrument and includes musical notations marked on a surface. The musical notations comprise a plurality of musical notes, with each of the twelve musical tones having a color. The color of each of the musical notes corresponds to a color assigned to a particular key to be pressed on the musical instrument. Also included is a plurality of stickers for coupling to the keys of a piano or similar musical instrument. Each sticker has a unique color corresponding to the color of one of the keys of the musical instrument.

To preserve the concept of music theory, the present invention allows sheet music to be written the same way it is now, with key signatures and accidentals; the primary difference is instead of having black notes, each note would be assigned one of twelve colors which are represented by the twelve tones, and as you change octaves, the colors repeat themselves.

In the system for associating musical notation with keys on a musical instrument, the color-coded notes would make it easier for advanced players to read difficult pieces of music with multiple key changes and many accidentals. By adding the colors to the notes, the connections that need to be made in the mind of the musician to distinguish which tones the notes on the sheet music represent, would be made automatically. This is a highly significant primary aspect of the invention, and other aspects of the invention contribute to this primary aspect.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new system for associating musical notation with keys on a musical instrument apparatus and method which has many of the advantages of the music reading aids mentioned heretofore and many novel features that result in a new system for associating musical notation with keys on a musical instrument which is not anticipated, rendered obvious, suggested, or even implied by any of the prior art music reading aids, either alone or in any combination thereof.

It is another object of the present invention to provide a new system for associating musical notation with keys on a musical instrument which may be easily and efficiently manufactured and marketed.

A further object of the present invention is to provide a new system for associating musical notation with keys on a musical instrument which is susceptible of a low cost of manufacture with regard to both materials and labor, and which accordingly is then susceptible of low prices of sale to the consuming public, thereby making such a system for associating musical notation with keys on a musical instrument economically available to the buying public.

Still yet another object of the present invention is to provide a new system for associating musical notation with keys on a musical instrument which provides in the apparatuses and methods of the prior art some of the advantages thereof, while simultaneously overcoming some of the disadvantages normally associated therewith.

Still another object of the present invention is to provide a new system for associating musical notation with keys on a musical instrument for aiding a pupil in learning to play a piano or other instrument by employing a much more efficient means for reading sheet music.

Even still another object of the present invention is to provide a new system for associating musical notation with keys on a musical instrument that includes a system for associating musical notation with keys on a musical instrument. The system includes musical notations marked on a surface. The musical notations comprise a plurality of musical notes, with each of the musical notes having a color. The color of each of the musical notes corresponds to a color assigned to a particular key to be pressed on the musical instrument that is represented by one of the twelve tones. Also included is a plurality of stickers for coupling to the keys of the musical instrument. Each sticker has a unique color corresponding to the color of one of the keys of the musical instrument. Illustratively, one of twelve colors is exclusively assigned to each one of the twelve tones in an octave of keys on the musical instrument, and the colors are repeated for the corresponding notes of each octave.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
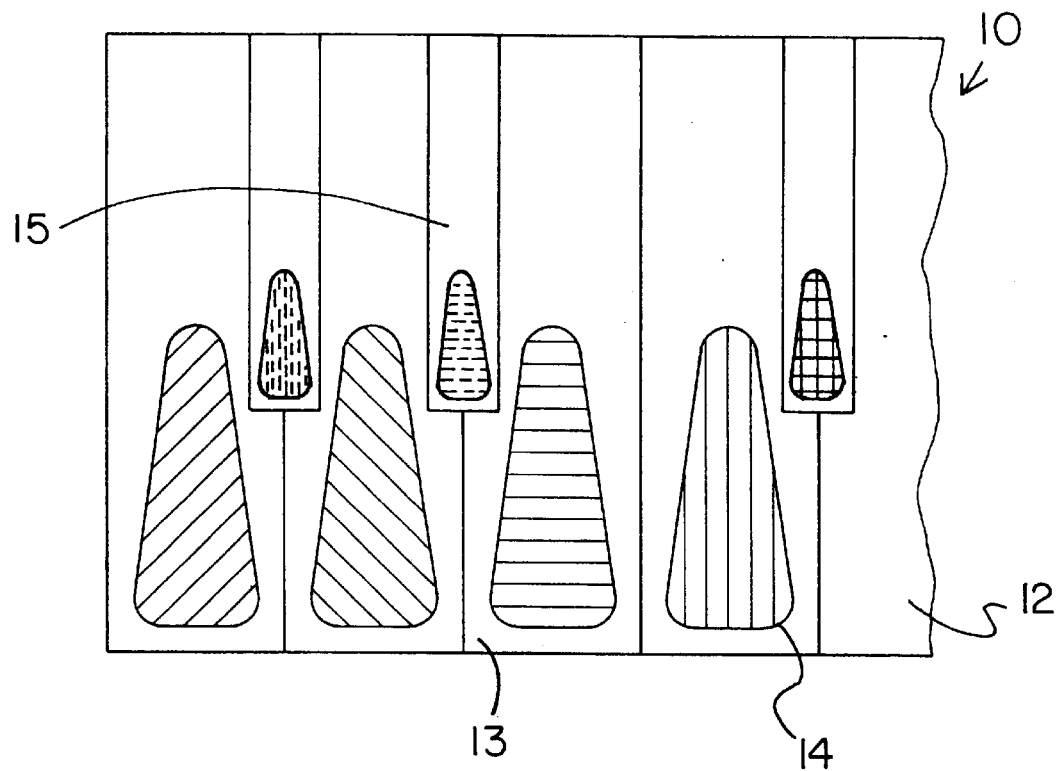
FIG. 1 is a top view of a new system for associating musical notation with keys on a musical instrument according to the present invention and particularly illustrating the stickers of the invention applied to the keys of a musical instrument.
Figure 2:
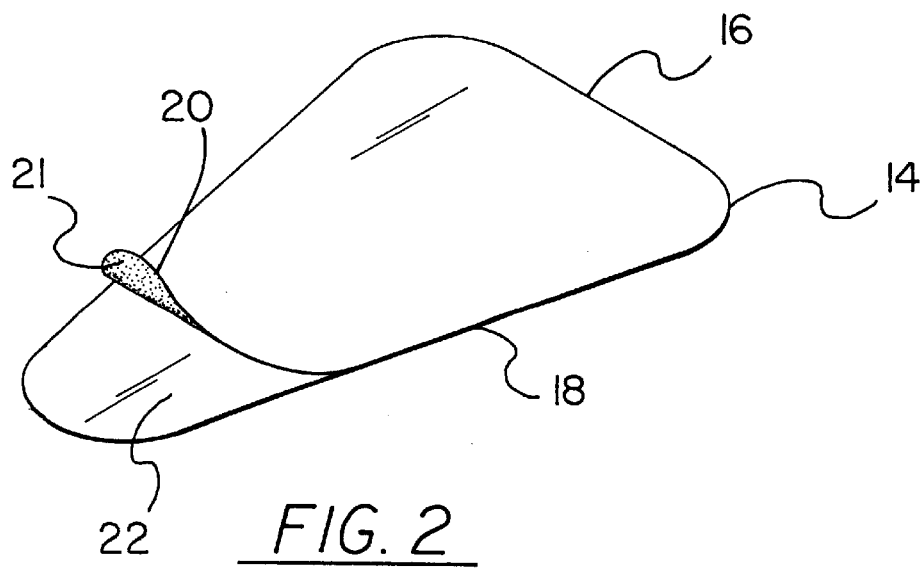
FIG. 2 is a perspective view of the sticker of the present invention.
Figure 3:
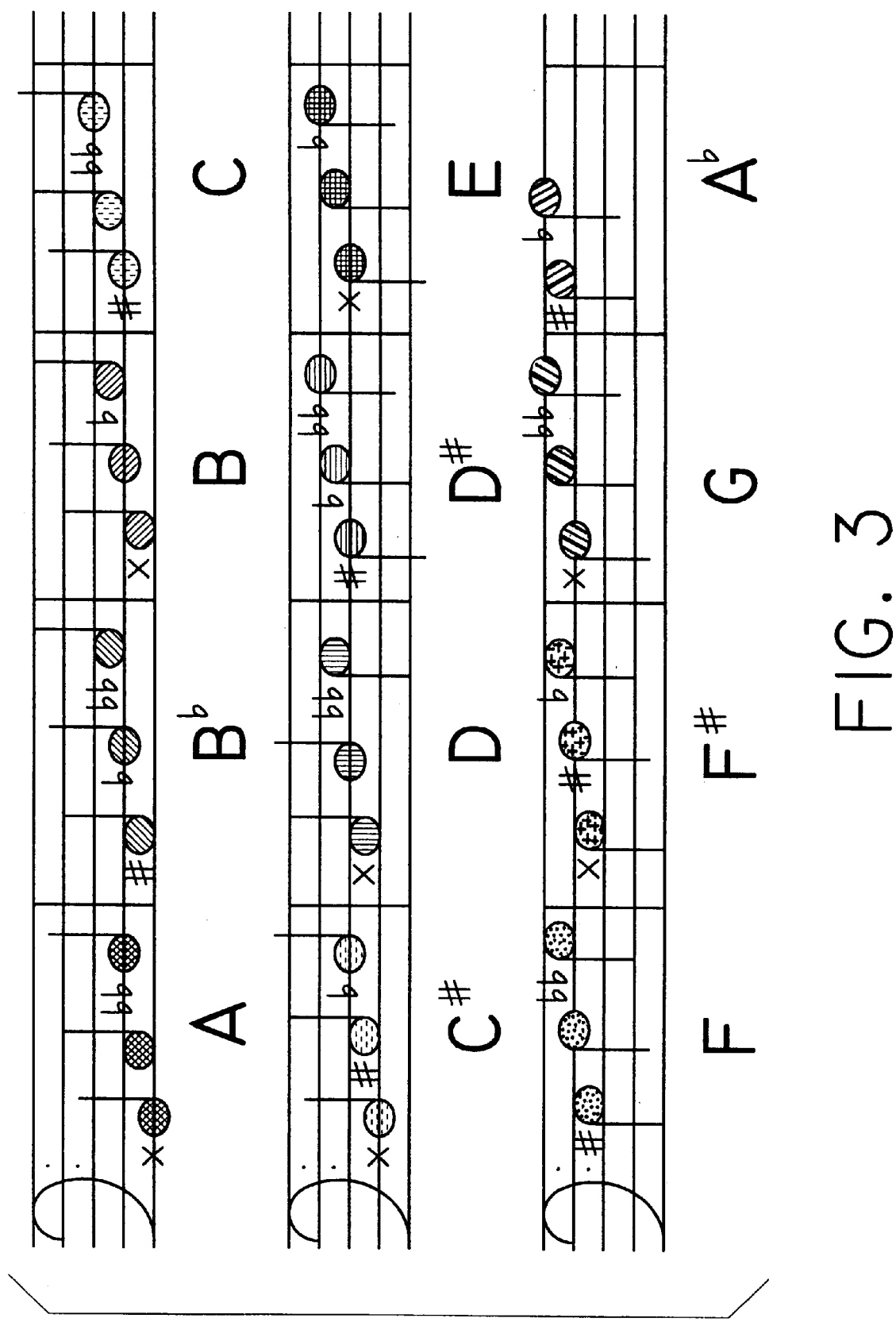
FIG. 3 is a schematic view of the musical notation of the present invention particularly illustrating the colors and each of the notes corresponding to the colors with the use of accidentals.

With reference now to the drawings, and in particular to FIGS. 1 through 4 thereof, a new system for associating musical notation with keys on a musical instrument embodying the principles and concepts of the present invention and generally designated by the reference numeral 10 will be described.

The present invention, as designated as numeral 10, is adapted for use with a musical instrument having a plurality of keys for being pressed by a player to produce sounds. Illustratively, the musical instrument comprises a piano having a plurality of keys comprising white keys and black keys. Typically, each of the keys of the piano has a generally planar rectangular top with an exposed upper surface visible to a player while manipulating the keys. The exposed upper surface of each key has relatively longer side edges and a shorter end edge. The exposed upper surface has a length extending parallel to the side edges.

A significant aspect of the invention is the musical notations marked on a surface. The surface may comprise a visually perceivable surface such as, for example, a sheet of paper or the screen of a computer display. The musical notations comprise a plurality of musical notes, with each of the musical notes having a color exclusively assigned to a key 12 of the instrument. The color of each of the musical notes thus corresponds to a color assigned to a particular key to be pressed on the musical instrument. In the illustrative case of the piano, one of twelve colors is exclusively assigned to each one of the twelve tones 12 in an octave of keys on the musical instrument. The keys of each of the other octaves has the same color assigned to the corresponding tones, such that an "A" tone in the bass clef has the same color as an "A" in the treble clef.

A plurality of stickers may be provided for coupling to the keys of the musical instrument. In the illustrative embodiment, the plurality of stickers comprising twelve stickers corresponding to the twelve keys of the octave of the piano. Each sticker has a top face, a bottom face, and a peripheral edge between the top and bottom faces. Each sticker may be constructed from a thin material.

The peripheral edge of the sticker may be defined by a linear front edge 16, a pair of linear side edges 18, and an arcuate rear edge 20. The linear side edges taper inwardly toward each other from the front edge rearward to the rear edge to permit the portion of the sticker adjacent the rear edge to fit between black keys extending into the side edges of the key. Each of the stickers have a length between the front edge and the rear edge, and the length of each of the stickers may be substantially equal to the length of the upper surface of the keys such that the rear edge of each of the stickers extends between black keys of the piano for facilitating visibility of each of the stickers on the keys when the fingers of a user are positioned above the keys. The size of the stickers may be adjusted to the size of the keys of the musical instrument. For example, the stickers adapted for attachment to the black keys 15 of a piano may be sized smaller than the stickers adapted for attachment to the white keys 13 of the piano (see FIG. 1).

The bottom face of the stickers may have an adhesive 21 thereon for adhering the stickers to the keys of the musical instrument. A low adhesion backing panel 22 may be provided for temporarily adhering to the adhesive prior to application of the sticker to a key of the instrument. Optionally, the stickers may be formed from a material that is adapted to permit mutual static attraction between the sticker and the key for holding the stickers on the upper surface of the keys.

Each sticker has a unique color corresponding to the color of one of the keys of the musical instrument. A first color represents the "A" white key, and wherein notes representing an "A", a "G double sharp" and a "B double flat" are marked in the first color. A second color represents the "B flat" black key, and wherein notes representing a "B flat", an "A sharp", and a "C double flat" are marked in the second color. A third color represents the "B" white key, and wherein notes representing a "B", an "A double sharp" and a "C flat" are marked in the third color. A fourth color represents the "C" white key, and wherein notes representing a "C", a "B sharp" and a "D double flat" are marked in the fourth color. A fifth color represents the "C sharp" black key, and wherein notes representing a "C sharp", a "B double sharp" and a "D flat" are marked in the fifth color. A sixth color represents the "D" white key, and wherein notes representing a "D", a "C double sharp" and an "E double flat" are marked in the sixth color. A seventh color represents the "D sharp" black key, and wherein notes representing a "D sharp", an "E flat" and an "F double flat" are marked in the seventh color. An eighth color represents the "E" white key, and wherein notes representing an "E", a "D double sharp" and an "F flat" are marked in the eighth color. A ninth color represents the "F" white key, and wherein notes representing an "F", an "E sharp" and a "G double flat" are marked in the ninth color. A tenth color represents the "F sharp" black key, and wherein notes representing an "F sharp", an "E double sharp" and a "G flat" are marked in the tenth color. An eleventh color represents the "G" white key, and wherein notes representing a "G", an "F double sharp" and an "A double flat" are marked in the eleventh color. A twelfth color represents the "A flat" black key, and wherein notes representing an "A flat" and a "G sharp" are marked in the twelfth color.

In one highly embodiment of the invention, the first color is cherry red, the second color is country rose, the third color is mint green, the fourth color is light blue, the fifth color is windsor blue, the sixth color is warm brown, the seventh color is wood bark brown, the eighth color is pale yellow, the ninth color is sherbert orange, the tenth color is hunter green, the eleventh color is kiwi green, and the twelfth color is claret.

Figure 4:
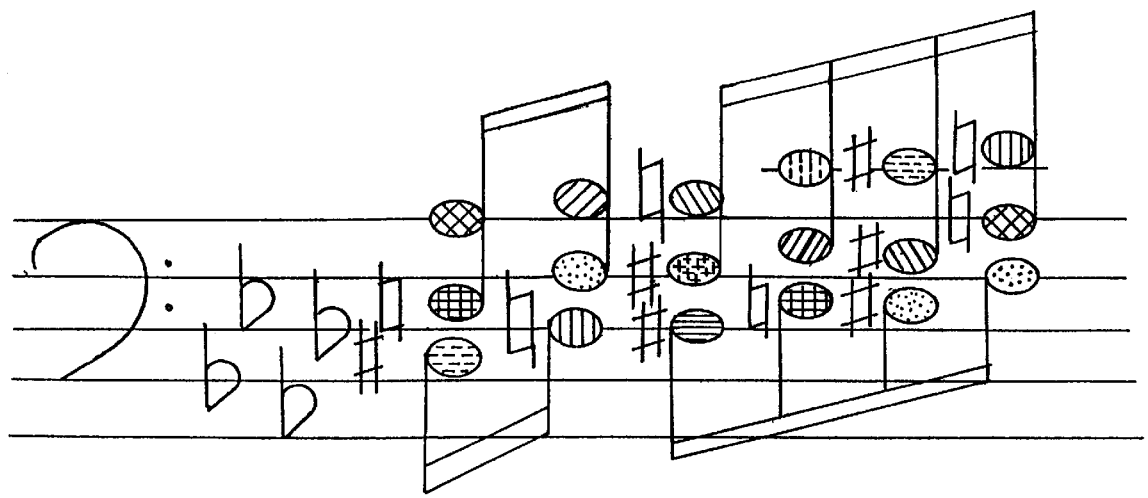
FIG. 4 is a schematic view of the musical notation of the invention applied to a small portion of Polonaise in A flat by Chopin.

FIG. 4 shows an application of the musical notation system of the invention applied to a piece of music, and illustrates the variation of color of the notes depending upon the keys of the instrument to be actuated. The student may then actuate the keys of the musical instrument corresponding to the colors of the notes marked on the surface, without having to determine the key to press by reading the position of the note on the clef and the applicable sharps, flats naturals, etc.

It should be realized that although the invention has been illustratively described with reference to a piano, the invention may be easily applied to other musical instruments not necessarily having a keyboard. Similarly, the invention is intended for use on sheet music for all the different types of instruments.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for associating musical notation with keys on a musical instrument, comprising:

musical notations marked on a surface, the musical notations comprising a plurality of musical notes, each of the musical notes having a color, the color of each of the musical notes corresponding to a color assigned to a particular key to be pressed on the musical instrument; and a plurality of stickers for coupling to the keys of the musical instrument, wherein each sticker has a unique color corresponding to the color of one of the keys of the musical instrument;

wherein one of twelve colors is exclusively assigned to each one of the twelve tones in an octave of keys on the musical instrument;

wherein a first color represents the "A" white key of the musical instrument, wherein a second color represents the "B flat" black key, wherein a third color represents the "B" white key, wherein a fourth color represents the "C" white key, wherein a fifth color represents the "C sharp" black key, wherein a sixth color represents the "D" white key, wherein a seventh color represents the "D sharp" black key, wherein an eighth color represents the "E" white key, wherein a ninth color represents the "F" white key, wherein a tenth color represents the "F sharp" black key, wherein an eleventh color represents the "G" white key, and wherein a twelfth color represents the "A flat" black key; and wherein notes marked on the surface representing an "A", a "G double sharp" and a "B double flat" are marked in the first color; wherein notes representing a "B flat", an "A sharp", and a "C double flat" are marked in the second color; wherein notes representing a "B", an "A double sharp" and a "C flat" are marked in the third color; wherein notes representing a "C", a "B sharp" and a "D double flat" are marked in the fourth color, wherein notes representing a "C sharp", a "B double sharp" and a "D flat" are marked in the fifth color; wherein notes representing a "D", a "C double sharp" and an "E double flat" are marked in the sixth color; wherein notes representing a "D sharp", an "E flat" and an "F double flat" are marked in the seventh color; wherein notes representing an "E", a "D double sharp" and an "F flat" are marked in the eighth color; wherein notes representing an "F", an "E sharp" and a "G double flat" are marked in the ninth color; wherein notes representing an "F sharp", an "E double sharp" and a "G flat" are marked in the tenth color; wherein notes representing a "G", an "F double sharp" and an "A double flat" are marked in the eleventh color; and wherein notes representing an "A flat" and a "G sharp" are marked in the twelfth color.

2. The system of claim 1 additionally comprising an instrument having a plurality of keys for being pressed by a player to produce sounds.

3. The system of claim 2 wherein the musical instrument comprises a piano, the plurality of keys of the piano comprising white keys and black keys.

4. The system of claim 3 wherein each of the keys has a generally planar rectangular top with an exposed upper surface visible to a player while manipulating the keys, the exposed upper surface of each key having relatively longer side edges and a shorter end edge, the exposed upper surface having a length extending parallel to the side edges.

5. The system of claim 1 wherein the plurality of stickers have twelve colors.

6. The system of claim 1 wherein each sticker is constructed from a thin material, and each sticker has a top face, a bottom face, and a peripheral edge between the top and bottom faces.

7. The system of claim 6 additionally comprising an instrument having a plurality of keys for being pressed by a player to produce sounds, wherein the musical instrument comprises a piano, the plurality of keys of the piano comprising white keys and black keys, and wherein the peripheral edge of the sticker is defined by a linear front edge, a pair of linear side edges, and an arcuate rear edge, the linear side edges tapering inwardly toward each other from the front edge rearward to the rear edge to permit the portion of the sticker adjacent the rear edge to fit between black keys of a piano extending into the side edges of a white key.

8. The system of claim 7 wherein each of the stickers has a length between the front edge and the rear edge, the length of each of the stickers being substantially equal to the length of the upper surface of the keys such that the rear edge of each of the stickers extends between black keys of the piano for facilitating visibility of each of the stickers on the keys when the fingers of a user are positioned above the keys.

9. The system of claim 1 wherein a bottom face of each of the stickers has an adhesive thereon for adhering the stickers to the keys of the musical instrument.

10. The system of claim 1 wherein the first color is cherry red, wherein the second color is country rose, wherein the third color is mint green, wherein the fourth color is light blue; wherein the fifth color is windsor blue, wherein the sixth color is warm brown, wherein the seventh color is wood bark brown, wherein the eighth color is pale yellow, wherein the ninth color is sherbert orange, wherein the tenth color is hunter green, wherein the eleventh color is kiwi green, and wherein the twelfth color is claret.

11. A system for associating musical notation with keys on a musical instrument, comprising:

a musical instrument having a plurality of keys for being pressed by a player to produce sounds, wherein the musical instrument comprises a piano, the plurality of keys of the piano comprising white keys and black keys, each of the keys having a generally planar rectangular top with an exposed upper surface visible to a player while manipulating the keys, the exposed upper surface of each key having relatively longer side edges and a shorter end edge, the exposed upper surface having a length extending parallel to the side edges;

musical notations marked on a surface, the musical notations comprising a plurality of musical notes, each of the musical notes having a color, the color of each of the musical notes corresponding to a color assigned to a particular key to be pressed on the musical instrument, wherein one of twelve colors is exclusively assigned to each one of the twelve tones in an octave of keys on the musical instrument; and a plurality of stickers for coupling to the keys of the musical instrument, the plurality of stickers having twelve colors;

each sticker having a top face, a bottom face, and a peripheral edge between the top and bottom faces; each sticker being constructed from a thin material;

the peripheral edge being defined by a linear front edge, a pair of linear side edges, and an arcuate rear edge, the linear side edges tapering inwardly toward each other from the front edge rearward to the rear edge to permit the portion of the sticker adjacent the rear edge to fit between black keys extending into the side edges of the key, each of the stickers having a length between the front edge and the rear edge, the length of each of the stickers being substantially equal to the length of the upper surface of the keys such that the rear edge of each of the stickers extends between black keys of the piano for facilitating visibility of each of the stickers on the keys when the fingers of a user are positioned above the keys; the the bottom face of the stickers having an adhesive thereon for adhering the stickers to the keys of the musical instrument;

wherein each sticker has a unique color corresponding to the color of one of the keys of the musical instrument;

wherein a first color represents the "A" white key, and wherein notes representing an "A", a "G double sharp" and a "B double flat" are marked in the first color, wherein the first color is cherry red;

wherein a second color represents the "B flat" black key, and wherein notes representing a "B flat", an "A sharp", and a "C double flat" are marked in the second color, wherein the second color is country rose;

wherein a third color represents the "B" white key, and wherein notes representing a "B", an "A double sharp" and a "C flat" are marked in the third color, wherein the third color is mint green;

wherein a fourth color represents the "C" white key, and wherein notes representing a "C", a "B sharp" and a "D double flat" are marked in the fourth color, wherein the fourth color is light blue;

wherein a fifth color represents the "C sharp" black key, and wherein notes representing a "C sharp", a "B double sharp" and a "D flat" are marked in the fifth color, wherein the fifth color is windsor blue;

wherein a sixth color represents the "D" white key, and wherein notes representing a "D", a "C double sharp" and an "E double flat" are marked in the sixth color, wherein the sixth color is warm brown;

wherein a seventh color represents the "D sharp" black key, and wherein notes representing a "D sharp", an "E flat" and an "F double flat" are marked in the seventh color, wherein the seventh color is wood bark brown;

wherein an eighth color represents the "E" white key, and wherein notes representing an "E", a "D double sharp" and an "F flat" are marked in the eighth color, wherein the eighth color is pale yellow;

wherein a ninth color represents the "F" white key, and wherein notes representing an "F", an "E sharp" and a "G double flat" are marked in the ninth color, wherein the ninth color is sherbert orange;

wherein a tenth color represents the "F sharp" black key, and wherein notes representing an "F sharp", an "E double sharp" and a "G flat" are marked in the tenth color, wherein the tenth color is hunter green;

wherein an eleventh color represents the "G" white key, and wherein notes representing a "G", an "F double sharp" and an "A double flat" are marked in the eleventh color, wherein the eleventh color is kiwi green; and wherein a twelfth color represents the "A flat" black key, and wherein notes representing an "A flat" and a "G sharp" are marked in the twelfth color, wherein the twelfth color is claret.

* * * * *